US012581203B2

(12) United States Patent
Tanaka et al.

(10) Patent No.: US 12,581,203 B2
(45) Date of Patent: Mar. 17, 2026

(54) DATA PROCESSING APPARATUS, METHOD, PROGRAM, AND MULTISPECTRAL CAMERA

(71) Applicant: FUJIFILM Corporation, Tokyo (JP)

(72) Inventors: Koichi Tanaka, Saitama (JP);
Yasunobu Kishine, Saitama (JP);
Kazuyoshi Okada, Saitama (JP);
Takashi Kunugise, Saitama (JP); Yuya Hirakawa, Saitama (JP); Tatsuro Iwasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 177 days.

(21) Appl. No.: 18/616,214

(22) Filed: Mar. 26, 2024

(65) Prior Publication Data

US 2024/0265510 A1      Aug. 8, 2024

Related U.S. Application Data

(63) Continuation of application No. PCT/JP2022/031318, filed on Aug. 19, 2022.

(30) Foreign Application Priority Data

Sep. 29, 2021     (JP) ................................. 2021-159739

(51) Int. Cl.
*H04N 23/81*          (2023.01)
*G01J 3/28*           (2006.01)
(Continued)

(52) U.S. Cl.
CPC ............ *H04N 23/81* (2023.01); *G01J 3/2803* (2013.01); *G01J 3/2823* (2013.01); *G06T 5/70* (2024.01);
(Continued)

(58) Field of Classification Search
None
See application file for complete search history.

(56) References Cited

U.S. PATENT DOCUMENTS 10,227,516 B2      3/2019  Kamai et al.
2022/0078359 A1*   3/2022  Kishine ................ H04N 25/135
                           (Continued)

FOREIGN PATENT DOCUMENTS

JP       2015117257      6/2015
JP       2021135404      9/2021
                 (Continued)

OTHER PUBLICATIONS

"International Search Report (Form PCT/ISA/210) of PCT/JP2022/031318," mailed on Nov. 1, 2022, with English translation thereof, pp. 1-5.

(Continued)

*Primary Examiner* — Paul M Berardesca
(74) *Attorney, Agent, or Firm* — JCIPRNET

(57)          ABSTRACT

A data processing apparatus, a method, a program, and a multispectral camera that can favorably remove an interference component and reduce noise included in a plurality of images output from an image sensor of a multispectral camera are provided. In a data processing method, first captured data that corresponds to a plurality of wavelength ranges output from an image sensor of a multispectral camera and that includes first noise is processed. In the data processing method, an interference removing parameter for removing an interference component included in the first captured data is acquired (step S30), and the interference component included in the first captured data is removed based on the interference removing parameter (step S40).

(Continued)

START

ACQUIRE RAW DATA ~S10

INTERPOLATION PROCESSING ~S20

ACQUIRE INTERFERENCE REMOVING PARAMETER ~S30

INTERFERENCE REMOVING PROCESSING ~S40

CONVERT NOISE AMOUNT PARAMETER ~S50

NOISE REDUCING PROCESSING ~S60

END

Then, noise reducing processing of reducing second noise included in second captured data after interference removing is performed (step S60).

16 Claims, 5 Drawing Sheets

(51) Int. Cl.
    *G06T 5/70*          (2024.01)
    *H04N 23/12*          (2023.01)
    *H04N 23/84*          (2023.01)
(52) U.S. Cl.
    CPC ............. *H04N 23/12* (2023.01); *H04N 23/84* (2023.01); *G01J 2003/2843* (2013.01); *G06T 2207/20192* (2013.01)

(56)                References Cited

U.S. PATENT DOCUMENTS

2022/0385863  A1    12/2022  Kishine et al.
2024/0212107  A1*   6/2024   Hirakawa ............. H04N 23/55

FOREIGN PATENT DOCUMENTS

WO          2021172284      9/2021
WO      WO-2024042783 A1 *   2/2024   ................ G01J 3/02

OTHER PUBLICATIONS

"Written Opinion of the International Searching Authority (Form PCT/ISA/237) of PCT/JP2022/031318," mailed on Nov. 1, 2022, with English translation thereof, pp. 1-6.

\* cited by examiner

DATA PROCESSING APPARATUS, METHOD, PROGRAM, AND MULTISPECTRAL CAMERA

CROSS-REFERENCE TO RELATED APPLICATIONS

The present application is a Continuation of PCT International Application No. PCT/JP2022/031318 filed on Aug. 19, 2022 claiming priority under 35 U.S.C § 119(a) to Japanese Patent Application No. 2021-159739 filed on Sep. 29, 2021. Each of the above applications is hereby expressly incorporated by reference, in its entirety, into the present application.

BACKGROUND OF THE INVENTION

1. Field of the Invention

The present invention relates to a data processing apparatus, a method, a program, and a multispectral camera, and particularly to a technology for removing an interference component and reducing noise included in a plurality of images output from an image sensor of a multispectral camera.

2. Description of the Related Art

In the related art, a solid-state imaging device that can suppress an effect of color mixing has been suggested (JP2015-177257A).

The solid-state imaging device according to JP2015-177257A includes a color image sensor and a color mixing correction part, in which the color mixing correction part comprises an output characteristic adjustment part that adjusts an output characteristic indicating a relationship between a level of signal output and a wavelength for each color component, and a coefficient holding part that holds a color mixing correction coefficient for color mixing correction and a color sensitivity difference correction coefficient for correcting a sensitivity difference between color components in the color image sensor, the coefficient holding part holds the color sensitivity difference correction coefficient set for each image height, and the output characteristic adjustment part reads out the color mixing correction coefficient and the color sensitivity difference correction coefficient for each image height from the coefficient holding part and performs correction of the sensitivity difference corresponding to the read color sensitivity difference correction coefficient and adjustment of the output characteristic using the color mixing correction coefficient.

In addition, the color mixing correction part comprises a noise reducing part that performs noise reducing processing with respect to a subject image. The noise reducing part comprises a function of reducing a noise component that is mainly increased because of the color mixing correction in the output characteristic adjustment part.

SUMMARY OF THE INVENTION

One embodiment according to the disclosed technology provides a data processing apparatus, a method, a program, and a multispectral camera that can favorably remove an interference component and reduce noise included in a plurality of images output from an image sensor of a multispectral camera.

The invention according to a first aspect is a data processing apparatus comprising a processor configured to process first captured data that corresponds to a plurality of wavelength ranges output from an image sensor of a multispectral camera having an opening region allowing transmission of light of different transmission wavelength ranges at a pupil position or near the pupil position and that includes first noise, in which the processor is configured to acquire an interference removing parameter for removing an interference component included in the first captured data, perform interference removing processing of removing the interference component included in the first captured data based on the interference removing parameter to generate second captured data, and perform noise reducing processing of reducing second noise included in the second captured data.

In the data processing apparatus according to a second aspect of the present invention, it is preferable that in the interference removing processing, at least duplicate images caused by the interference component are removed.

In the data processing apparatus according to a third aspect of the present invention, it is preferable that the processor is configured to acquire noise characteristic data indicating a noise characteristic of the first captured data, acquire a first noise amount parameter based on a signal value of a pixel of the first captured data and on the noise characteristic data, and acquire a second noise amount parameter based on the acquired first noise amount parameter and on the interference removing parameter.

In the data processing apparatus according to a fourth aspect of the present invention, it is preferable that the processor is configured to store the second noise amount parameter in a first memory as a conversion table using the first noise amount parameter as a variable.

In the data processing apparatus according to a fifth aspect of the present invention, it is preferable that the processor is configured to store the second noise amount parameter in a second memory, newly acquire the second noise amount parameter based on a condition set in advance, and update the second noise amount parameter stored in the second memory with the newly acquired second noise amount parameter.

In the data processing apparatus according to a sixth aspect of the present invention, it is preferable that the condition set in advance is a change of a subject.

In the data processing apparatus according to a seventh aspect of the present invention, it is preferable that the condition set in advance is a change of an imaging condition of the multispectral camera.

In the data processing apparatus according to an eighth aspect of the present invention, it is preferable that the noise reducing processing is processing of reducing the second noise with respect to the second captured data using the second noise amount parameter.

In the data processing apparatus according to a ninth aspect of the present invention, it is preferable that the noise reducing processing is processing of reducing the second noise based on a feature amount of an image structure of a subject.

In the data processing apparatus according to a tenth aspect of the present invention, it is preferable that in the noise reducing processing, whether a pixel of interest of the second captured data for reducing noise is a pixel of a flat region or a pixel of an edge region is determined by comparing at least the second noise amount parameter with the noise characteristic, in a case where the pixel of interest is determined as a pixel of the flat region, filter processing of reducing the second noise is performed by applying a smoothing filter to the pixel of interest, and in a case where the pixel of interest is determined as a pixel of the edge region, filter processing of reducing the second noise is performed while preserving an edge by applying an edge-preserving smoothing filter to the pixel of interest.

The invention according to an eleventh aspect is a multispectral camera comprising an imaging optical system in which a plurality of first polarizing filters having different polarizing directions are disposed in an opening region, an image sensor including a plurality of second polarizing filters that are disposed in each pixel of the image sensor and that correspond to the plurality of first polarizing filters, and the data processing apparatus.

The invention according to a twelfth aspect is a data processing method of processing first captured data that corresponds to a plurality of wavelength ranges output from an image sensor of a multispectral camera and that includes first noise, the method comprising a step of acquiring an interference removing parameter for removing an interference component included in the first captured data, a step of performing interference removing processing of removing the interference component included in the first captured data based on the interference removing parameter to generate second captured data, and a step of performing noise reducing processing of reducing second noise included in the second captured data, in which a processor is configured to execute processing of each step.

In the data processing method according to a thirteenth aspect of the present invention, it is preferable that in the step of removing the interference component, at least duplicate images caused by the interference component are removed.

It is preferable that the data processing method according to a fourteenth aspect of the present invention further comprises a step of acquiring a first noise amount parameter based on a signal value of a pixel of the first captured data, and a step of acquiring a second noise amount parameter based on the acquired first noise amount parameter and on the interference removing parameter.

It is preferable that the data processing method according to a fifteenth aspect of the present invention further comprises a step of acquiring a corresponding second noise amount parameter from a conversion table based on the first noise amount parameter, in which the conversion table stores the second noise amount parameter using the first noise amount parameter as a variable.

In the data processing method according to a sixteenth aspect of the present invention, it is preferable that in the processing of reducing the second noise, the second noise is reduced with respect to the second captured data using the second noise amount parameter.

In the data processing method according to a seventeenth aspect of the present invention, it is preferable that in the processing of reducing the second noise, the second noise is reduced based on a feature amount of an image structure of a subject.

The invention according to an eighteenth aspect is a data processing program causing the processor to execute processing of each step in the data processing method.

DESCRIPTION OF THE PREFERRED EMBODIMENTS

Hereinafter, preferred embodiments of a data processing apparatus, a method, a program, and a multispectral camera according to the embodiment of the present invention will be described in accordance with the accompanying drawings.
[Configuration of Imaging System]

Figure 1:
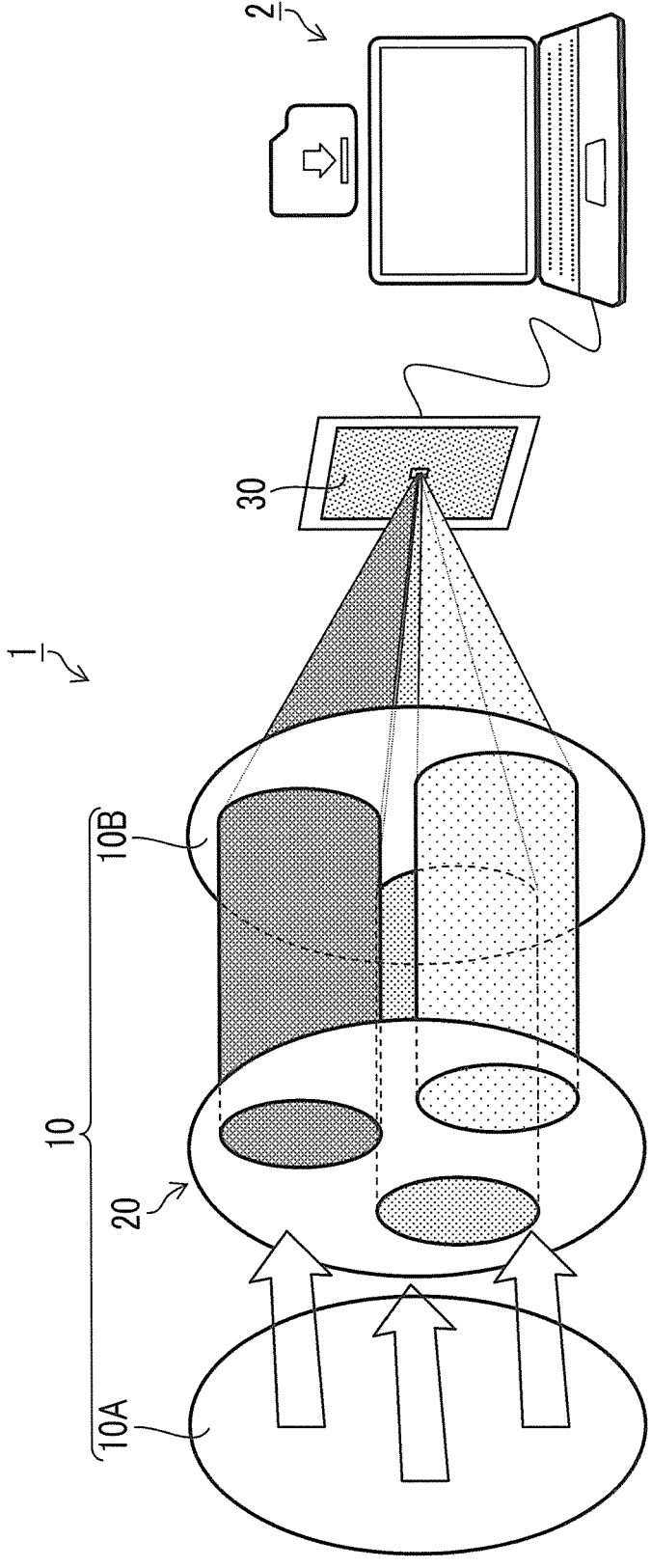
FIG. 1 is a diagram illustrating a system configuration of an imaging system including a data processing apparatus according to an embodiment of the present invention.

FIG. 1 is a diagram illustrating a system configuration of an imaging system including the data processing apparatus according to the embodiment of the present invention.

The imaging system illustrated in FIG. 1 is composed of a multispectral camera 1 and a data processing apparatus 2.

The multispectral camera 1 comprises an imaging optical system 10 and an image sensor 30.

The imaging optical system 10 of the present example includes a front group lens 10A and a rear group lens 10B, in which a filter unit 20 is disposed at a pupil position or near the pupil position between the front group lens 10A and the rear group lens 10B.

Figure 2:
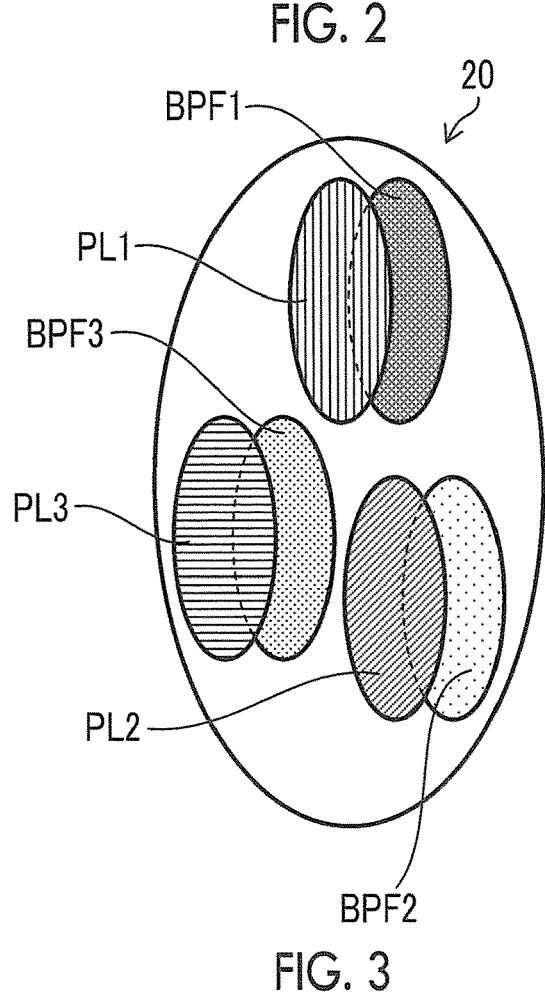
FIG. 2 is a perspective view illustrating a filter unit disposed in an imaging optical system of a multispectral camera.

FIG. 2 is a perspective view illustrating the filter unit disposed in the imaging optical system of the multispectral camera.

As illustrated in FIG. 2, the filter unit 20 has an opening region that allows transmission of light of different transmission wavelength ranges. In the example illustrated in FIG. 2, the filter unit 20 includes a first bandpass filter BPF1 that allows transmission of light of a first wavelength range, a second bandpass filter BPF2 that allows transmission of light of a second wavelength range, and a third bandpass filter BPF3 that allows transmission of light of a third wavelength range, which are three circular opening regions at equal intervals.

In addition, a plurality of (in the present example, three) polarizing filters (first polarizing filters) PL1, PL2, and PL3 having different polarizing directions are disposed in the opening region of the filter unit 20. The polarizing filter PL1 absorbs a left-right direction component of unpolarized light and allows transmission of an up-down direction component of the unpolarized light in FIG. 2. Hereinafter, it will be assumed that a direction (polarizing direction) of linearly polarized light transmitted through the polarizing filter PL1 is 0°.

In a case where a clockwise direction in FIG. 2 is positive, the polarizing direction of the linearly polarized light transmitted through the polarizing filter PL2 is 45°, and the polarizing direction of the linearly polarized light transmitted through the polarizing filter PL3 is 90°. That is, the three polarizing filters PL1, PL2, and PL3 are disposed to have different polarizing directions from each other. The polarizing directions of the polarizing filters PL1, PL2, and PL3 are not limited to 0°, 45°, and 90° and may be, for example, 0°, 60°, and 120°.

With reference to FIG. 2 again, light emitted from a subject is transmitted through the three opening regions of the imaging optical system 10 and is incident on the image sensor 30 as subject light having different wavelength ranges and different polarizing directions from each other.

Figure 3:
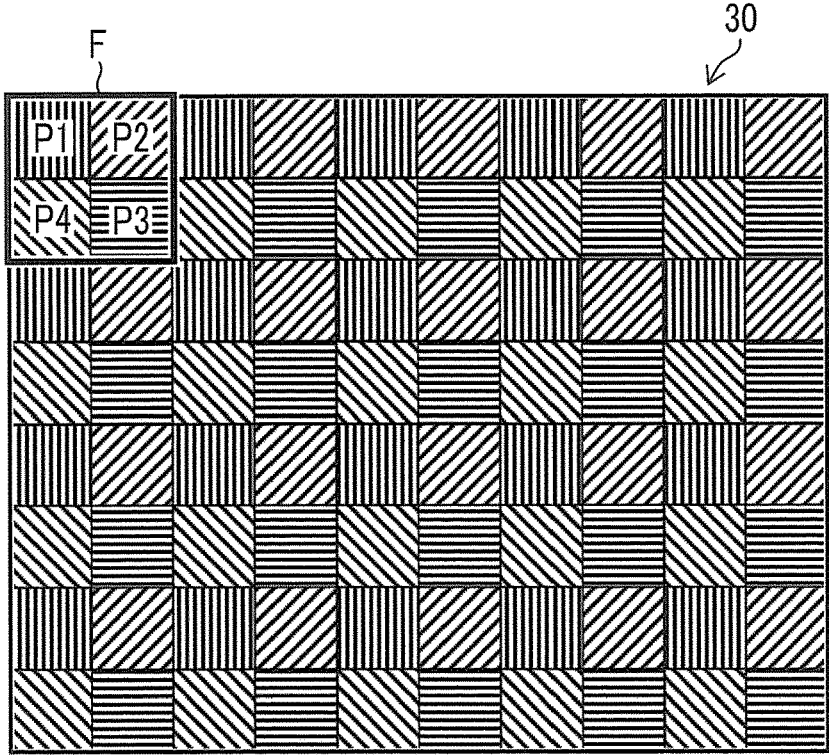
FIG. 3 is a plan view of an image sensor of the multispectral camera and is a diagram illustrating a micropolarizer disposed in each pixel of the image sensor.

FIG. 3 is a plan view of the image sensor of the multispectral camera and is a diagram illustrating a micropolarizer disposed in each pixel of the image sensor.

As illustrated in FIG. 3, four micropolarizers (second polarizing filters) P1, P2, P3, and P4 having different polarizing directions are disposed in each pixel of the image sensor 30. The micropolarizer P1 allows transmission of an up-down direction component of an incidence ray in FIG. 3. In a case where the polarizing direction of the micropolarizer P1 is 0°, the polarizing directions of the micropolarizers P2, P3, and P4 are 45°, 90°, and 135°.

In a case where four micropolarizers P1 to P4 adjacent to each other are referred to as a basic arrangement pattern F, the micropolarizers P1 to P4 of the basic arrangement pattern F are repeatedly arranged in an up-down direction and in a left-right direction in FIG. 3 in each pixel of the image sensor 30.

The polarizing filters PL1, PL2, and PL3 (FIG. 2) disposed in the three opening regions of the filter unit 20, respectively, and the micropolarizers P1, P2, P3, and P4 disposed on each pixel of the image sensor 30 are a pupil-splitting part that splits a pupil for the subject light of different wavelength ranges transmitted through the three opening regions of the imaging optical system 10, respectively, and that causes each subject light to be incident on the pixels of the image sensor 30 having corresponding polarizing directions. That is, the present example employs a pupil-splitting part of a "polarizing type" that separates the subject light of different wavelength ranges, and this makes it easy to miniaturize the camera and makes it possible to acquire a plurality of wavelength images without parallax. Thus, the present example has an advantage of being suitable for macro imaging.

However, in this pupil-splitting type, the subject light of different wavelength ranges cannot be favorably separated, and information about the plurality of wavelength images is mixed in a signal obtained from each pixel of the image sensor 30. This is referred to as "interference". In addition, in the state of interference, problems arise in that distortion occurs and duplicate edges occur in the image because of pupil positions and opening shapes of the opening regions allowing transmission of each wavelength range in the filter unit 20.

Particularly, in the case of the "polarizing type", in a case where there are three or more rays of the subject light to be separated (there are three or more opening regions), the subject light having a polarizing direction different from the subject light having a polarizing direction in the same direction as the polarizing direction of the micropolarizer provided in each pixel of the image sensor 30 is incident relatively more on the pixel.

In a case where there are two rays of the subject light to be separated (there are two opening regions), two polarizing filters having polarizing directions orthogonal to each other are provided in the two opening regions, and two micropolarizers having polarizing directions orthogonal to each other are provided in each pixel of the image sensor.

However, even in this case, interference occurs because of a slight angular deviation and the like between the polarizing filters and the micropolarizers.

The multispectral camera 1 of the present example splits the pupil to capture the subject light for each of the three wavelength ranges transmitted through the three opening regions in which the first bandpass filter BPF1, the second bandpass filter BPF2, and the third bandpass filter BPF3 are disposed. However, as described above, since the subject light of the three wavelength ranges is incident on each pixel of the image sensor 30, captured data (first captured data) corresponding to the three wavelength ranges output from the image sensor 30 includes an interference component.

Figure 4:
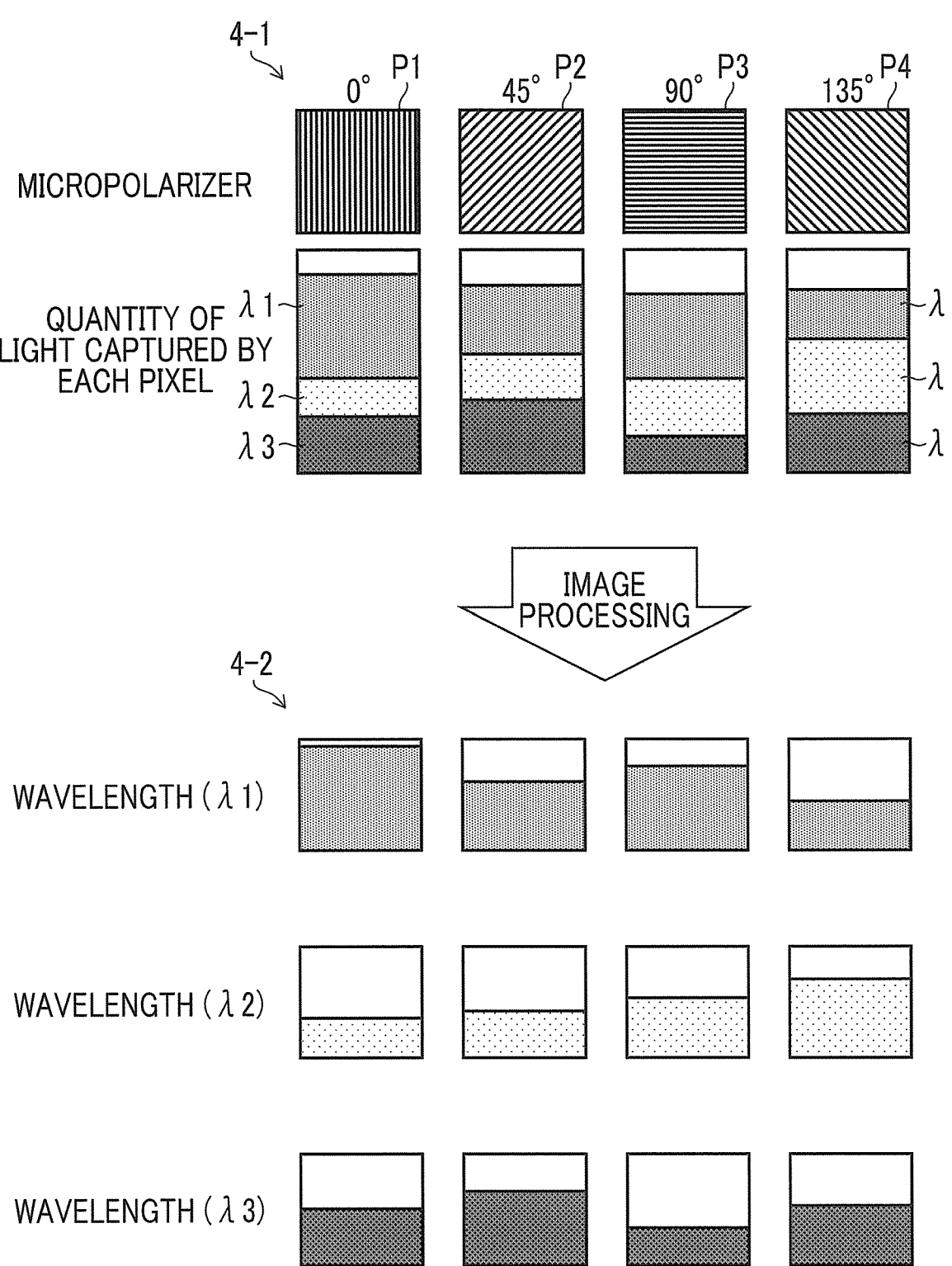
FIG. 4 is a conceptual diagram illustrating a light quantity including a ratio of interference among light of three wavelengths captured by each pixel in which four micropolarizers having different polarizing directions of the image sensor are disposed, and a light quantity for each of the three wavelengths separated from each pixel by image processing.

FIG. 4 is a conceptual diagram illustrating a light quantity including a ratio of interference among light of three wavelengths captured by each pixel in which four micropolarizers having different polarizing directions of the image sensor are disposed, and a light quantity for each of the three wavelengths separated from each pixel by image processing.

In FIG. 4, the three wavelengths (21, 22, and 23) are representative wavelengths of the first wavelength range, the second wavelength range, and the third wavelength range (for example, central wavelengths of the wavelength ranges) transmitted through the first bandpass filter BPF1, the second bandpass filter BPF2, and the third bandpass filter BPF3, respectively.

4-1 of FIG. 4 illustrates an example of the quantity (the ratio of interference) of the light for each wavelength captured by each pixel in which the four micropolarizers P1 to P4 are disposed.

As illustrated in 4-1 of FIG. 4, for example, the light of the wavelength (21) transmitted through the first bandpass filter BPF1 (refer to FIG. 2) corresponding to the polarizing filter PL1 having a polarizing direction of 0° is incident more on the pixel in which the micropolarizer P1 is disposed. However, the light of the wavelength (22) and the wavelength (23) transmitted through the second bandpass filter BPF2 and the third bandpass filter BPF3 is also incident on the pixel. The light of the three wavelengths (21, 22, and 23) is also incident on the pixels in which the other micropolarizers P2 to P4 are disposed.

Thus, image processing (interference removing processing) is performed in order to extract wavelength images of only the wavelength ($\lambda 1$), the wavelength ($\lambda 2$), and the wavelength ($\lambda 3$).

The interference removing processing is performed as follows.

In a case where signal values that are output from the image sensor 30 and that are output from the pixels (polarizing pixels) of polarizing directions of 0°, 45°, and 90° in which the micropolarizers P1, P2, and P3 are disposed are denoted by S1, S2, and S3, respectively, and interference removing parameters indicating the ratio of interference are denoted by C11 to C33, signal values $S_{\lambda 1}$, $S_{\lambda 2}$, and $S_{\lambda 3}$ after the interference removing are calculated using [Expression 1] below.

[Expression 1]

$$S_{\lambda 1} = C11 * S1 + C12 * S2 + C13 * S3$$

$$S_{\lambda 2} = C21 * S1 + C22 * S2 + C23 * S3$$

$$S_{\lambda 3} = C31 * S1 + C32 * S2 + C33 * S3$$

While the interference removing parameters (C11 to C33) change under various conditions such as the number of cameras and a focus position, the interference removing parameters can be obtained in advance and stored.

4-2 of FIG. 4 illustrates the light quantity for each of the three wavelengths ($\lambda$1, $\lambda$2, and $\lambda$3) separated from each polarizing pixel by the interference removing processing. Information for each of the wavelengths ($\lambda$1, $\lambda$2, and $\lambda$3) is obtained from each polarizing pixel, and since an amount of information is large, a wavelength image having high resolution can be acquired.

Summary of Present Invention

The captured data output from the image sensor of the camera includes noise (readout noise) caused by signal readout from the image sensor. The readout noise includes shot noise, dark shot noise, dark shot noise, fixed-pattern noise, and the like. While the readout noise is noise having randomness, an amount of a noise signal included is increased as a signal value to be read out is increased.

Therefore, noise reducing processing is performed for the purpose of removing the noise signal included in the captured data.

Generally, in the noise reducing processing, it is ideal to reduce only the noise without blurring an edge by distinguishing between an edge signal and the noise signal in the image. In implementing this, a method of obtaining a feature amount of an image structure of the subject in accordance with a signal value S of each pixel of the captured data and distinguishing between the edge signal and the noise signal from the feature amount is employed.

The present inventors have found a problem specific to the multispectral camera. That is, while the signal immediately after being output from the image sensor 30 of the multispectral camera 1 does not depend on the polarizing direction and the noise of each pixel is noise having the same characteristic, duplicate edges, as described above, occur in the captured data before the interference removing because of an effect of interference, thereby decreasing accuracy of edge determination.

Therefore, in the present invention, the interference removing processing is performed first with respect to the non-processed captured data immediately after being output from the image sensor 30 of the multispectral camera 1 to reduce duplicate edges (duplicate images) caused by the effect of interference, and then the noise reducing processing is performed with respect to the captured data after the interference removing.

[Data Processing Apparatus]

The data processing apparatus 2 can be composed of, for example, a personal computer (PC) as illustrated in FIG. 1 and acquires the non-processed captured data (referred to as "RAW data") immediately after being output from the image sensor 30 of the multispectral camera 1 through wired or wireless communication or through recording media (memory card) and generates the captured data for each of the wavelengths ($\lambda$1, $\lambda$2, and $\lambda$3) by performing various types of data processing (RAW development treatment) including the interference removing processing and the noise reducing processing with respect to the acquired RAW data.

Figure 5:
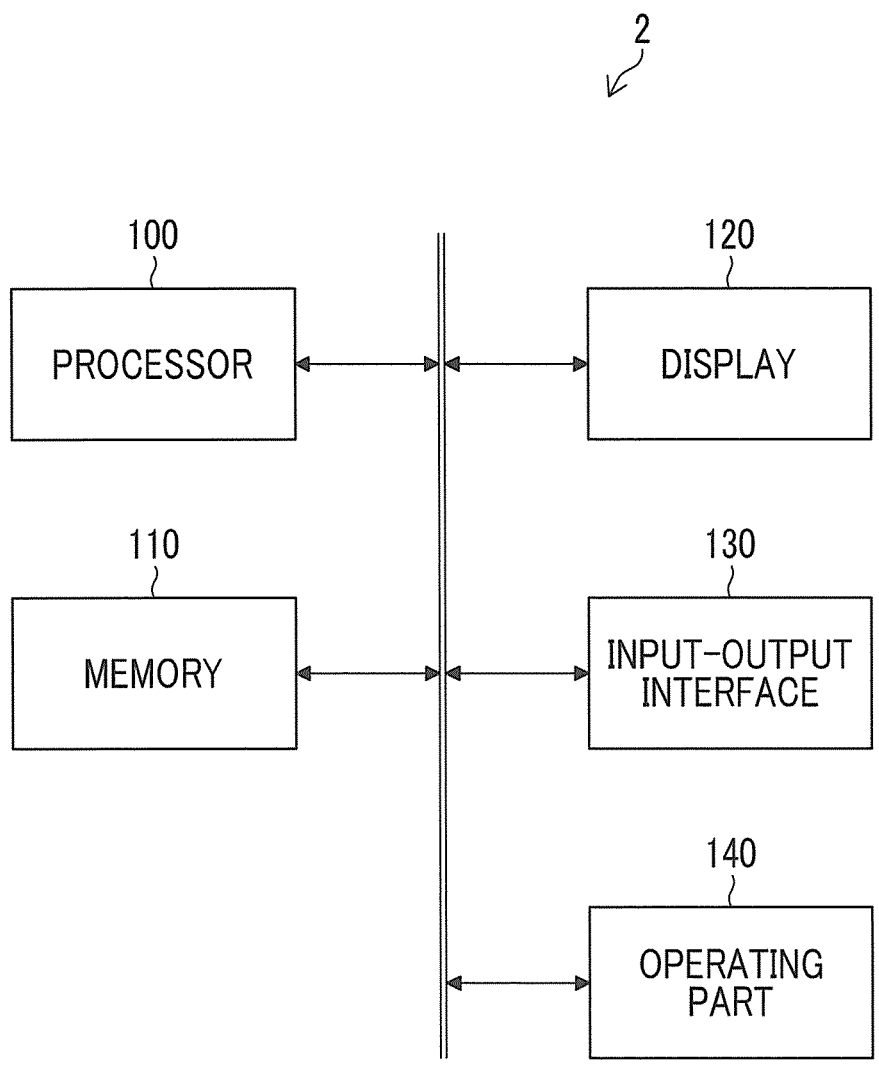
FIG. 5 is a block diagram illustrating an embodiment of a hardware configuration of the data processing apparatus according to the embodiment of the present invention.

FIG. 5 is a block diagram illustrating an embodiment of a hardware configuration of the data processing apparatus according to the embodiment of the present invention.

As illustrated in FIG. 5, the data processing apparatus 2 composed of a PC comprises a processor 100, a memory 110, a display 120, an input-output interface 130, an operating part 140, and the like.

The processor 100 is composed of a central processing unit (CPU) or the like, manages and controls each part of the data processing apparatus 2, and functions as various data processing parts including the interference removing processing and the noise reducing processing.

The memory 110 includes a flash memory, a read-only memory (ROM), a random access memory (RAM), a hard disk apparatus, and the like. The flash memory, the ROM, or the hard disk apparatus is a non-volatile memory storing an operating system, the data processing program according to the embodiment of the present invention, various parameters to be used for data processing, and the like.

The processor 100 can acquire the data processing program and the various parameters from a server of a manufacturer of the multispectral camera 1 or from recording media attached to the multispectral camera 1 and store the data processing program and the various parameters in the memory 110 in advance based on an operation input provided using the operating part 140. In addition, the flash memory or the hard disk apparatus stores the captured data after the data processing.

The RAM functions as a work region of the data processing performed by the processor 100 and temporarily stores the data processing program and the like stored in the flash memory or the like. The processor 100 may incorporate a part (RAM) of the memory 110.

The display 120 displays a screen for operating the data processing apparatus 2 and displays the image for each of the wavelengths (21, 22, and 23) after the data processing.

The input-output interface 130 includes a connecting part connectable to an external apparatus, a communication part connectable to a network, and the like. Examples of the connecting part connectable to the external apparatus include a universal serial bus (USB), a High-Definition Multimedia Interface (HDMI) (HDMI is a registered trademark), and a card slot in which a memory card is mounted.

The operating part 140 is a part that includes a pointing device such as a mouse and a touchpad, a keyboard, and the like and that receives various operation inputs provided by a user.

[Data Processing Method]

Next, an embodiment of the data processing method according to the embodiment of the present invention will be described.

Figure 6:
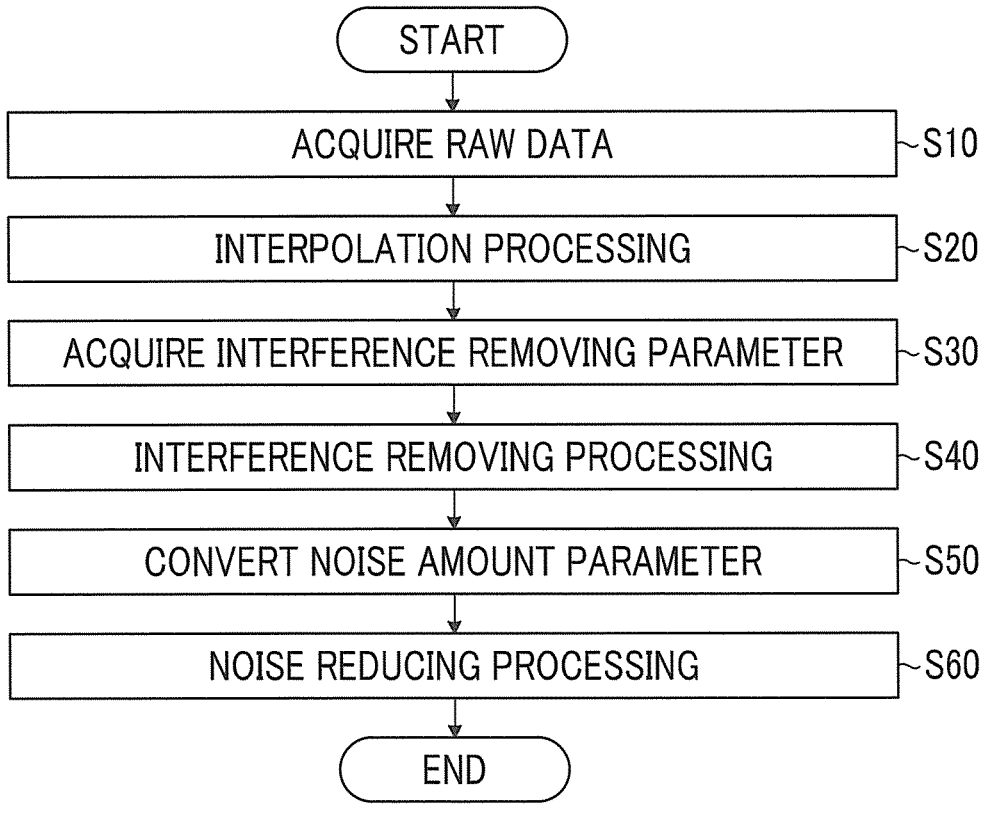
FIG. 6 is a flowchart illustrating an embodiment of a data processing method according to the embodiment of the present invention.

FIG. 6 is a flowchart illustrating the embodiment of the data processing method according to the embodiment of the present invention.

The processor 100 illustrated in FIG. 5 executes processing of each step illustrated in the flowchart in FIG. 6 in accordance with the data processing program.

In FIG. 6, the processor 100 acquires the RAW data as a target for the data processing through the input-output interface 130 based on the operation input provided using the operating part 140 (step S10). The RAW data is the non-processed captured data (first captured data) output from the image sensor 30 of the multispectral camera 1. In addition, the RAW data includes the random readout noise (first noise) in the image sensor 30 and further includes the interference component as illustrated in 4-1 of FIG. 4.

The processor 100 performs interpolation processing on the acquired RAW data to generate a signal value of a pixel of a polarizing direction that is insufficient among signal values of four polarizing directions of 0°, 45°, 90°, and 135° at a position of each pixel of the RAW data (step S20).

For example, in a case where a pixel of the image sensor 30 is the polarizing pixel having the polarizing direction of 0°, signal values in the polarizing directions of 45°, 90°, and 135° are insufficient. Therefore, signal values of a plurality of polarizing pixels having the polarizing direction of 45° around the pixel are interpolated to set the insufficient signal value in the polarizing direction of 45°. Similarly, signal values in the polarizing directions of 90° and 135° are generated by the interpolation processing. Accordingly, four pieces of the captured data having the polarizing directions of 0°, 45°, 90°, and 135° can be generated.

In the present example, since each captured data having the polarizing directions of 0°, 45°, and 90° is subjected to the interference removing as the captured data corresponding to the wavelengths ($\lambda 1$, $\lambda 2$, and $\lambda 3$), respectively, the captured data having the polarizing direction of 135° may not be generated by interpolation. However, the captured data having the polarizing direction of 135° may also be generated by interpolation, and this captured data may also be used for the interference removing. In this case, an expression different from [Expression 1] above is used.

Next, the processor 100 acquires the interference removing parameters to be used for removing the interference component included in the captured data from the memory 110 (step S30). The interference removing parameters of the present example are the interference removing parameters (C11 to C33) in [Expression 1] above. The interference removing parameters (C11 to C33) change under various conditions such as the number of cameras and the focus position. Accordingly, in acquiring the interference removing parameters (C11 to C33), the processor 100, for example, preferably acquires information related to the number of cameras and an imaging condition (focus position and the like) from a header part of a RAW file in which the RAW data is recorded.

Next, the processor 100 performs the interference removing processing of removing duplicate images caused by the interference component (step S40). In a case where three signal values at a pixel position (pixel of interest) in three pieces of the captured data having the polarizing directions of 0°, 45°, and 90° are denoted by S1, S2, and S3, respectively, signal values (S($\lambda 1$), S($\lambda 2$), and S($\lambda 3$)) for each of the wavelengths ($\lambda 1$, $\lambda 2$, and $\lambda 3$) after the interference removing are calculated based on [Expression 1] using the signal values (S1, S2, and S3) and the interference removing parameters (C11 to C33) acquired in step S30.

By performing the above operation with respect to all pixels of the captured data, the captured data (second captured data) in which the interference component is removed can be generated.

Next, the processor 100 acquires a first noise amount parameter for the captured data (first captured data) before the interference removing and converts the first noise amount parameter into a second noise amount parameter in accordance with the interference removing (step S50). This is done because a noise characteristic changes because of the interference removing.

Here, the first noise amount parameter and the second noise amount parameter will be described in further detail.

The readout noise (first noise) included in the first captured data output from the image sensor 30 is noise having randomness.

In order to reduce only the noise without blurring the edge by distinguishing between the edge signal and the noise signal in the captured data, the feature amount of the image structure of the subject is obtained in accordance with the signal value S of each pixel of the captured data, and the edge signal and the noise signal are distinguished from each other by comparing the feature amount with a threshold value.

The feature amount of the image structure of the subject is a feature amount indicating whether a minute region of the captured data including any pixel is a flat region or an edge region including an edge.

In the present example, a standard deviation ($\sigma(S)$) is calculated as the feature amount of the image structure based on the signal value S of the minute region (for example, 5×5 pixels) of the captured data including any pixel (pixel of interest). The standard deviation ($\sigma(S)$) will be referred to as noise characteristic data.

Before the interference removing, noise amount parameters (first noise amount parameters ($\sigma(S1)$, $\sigma(S2)$, and $\sigma(S3)$)) are calculated for each of the signal values (S1, S2, and S3) of the pixel of interest of the first captured data, assuming that the first noise having the same characteristic is present in the first captured data for each of all of the wavelengths ($\lambda 1$, $\lambda 2$, and $\lambda 3$).

While the first noise included in the first captured data is noise having randomness, a noise characteristic (randomness) of second noise included in the second captured data after the interference removing changes because of the interference removing.

Therefore, the processor 100 converts the first noise amount parameters ($\sigma(S1)$, $\sigma(S2)$, and $\sigma(S3)$) into second noise amount parameters ($\sigma'_{\lambda 1}$, $\sigma'_{\lambda 2}$, and $\sigma'_{\lambda 3}$) in accordance with the interference removing parameters (C11 to C33) using [Expression 2] below (step S50).

[Expression 2]

$$\sigma'_{\lambda 1} = \mathrm{Sqrt}\{(C11 * \sigma(S1))^2 + (C12 * \sigma(S2))^2 + (C13 * \sigma(S3))^2\}$$

$$\sigma'_{\lambda 2} = \mathrm{Sqrt}\{(C21 * \sigma(S1))^2 + (C22 * \sigma(S2))^2 + (C23 * \sigma(S3))^2\}$$

$$\sigma'_{\lambda 3} = \mathrm{Sqrt}\{(C31 * \sigma(S1))^2 + (C32 * \sigma(S2))^2 + (C33 * \sigma(S3))^2\}$$

By performing the above operation for each pixel of the first captured data of all of the wavelengths ($\lambda 1$, $\lambda 2$, and $\lambda 3$), a noise amount map corresponding to the wavelengths ($\lambda 1$, $\lambda 2$, and $\lambda 3$) is generated.

The processor 100 performs the noise reducing processing of reducing the second noise included in the second captured data for each of the wavelengths ($\lambda 1$, $\lambda 2$, and $\lambda 3$) after the interference removing using the noise amount map consisting of the second noise amount parameters ($\sigma'_{\lambda 1}$, $\sigma'_{\lambda 2}$, and $\sigma'_{\lambda 3}$) converted in step S50 (step S60).

In the case of performing the noise reducing processing, first, whether the pixel of interest is a pixel of the flat region or a pixel of the edge region is determined by calculating the standard deviation ($\sigma(S)$) in the minute region including the pixel of interest and comparing the standard deviation ($\sigma(S)$) with the second noise amount parameters.

Here, the second noise amount parameters are threshold values for distinguishing between the edge signal and the noise signal and are read out from a table.

The processor 100, for example, acquires the second noise amount parameter ($\sigma'_{\lambda 1}$) corresponding to the same pixel position as the pixel of interest from the generated noise amount map with respect to the signal value of the pixel of interest for reducing the noise in the second captured data of the wavelength ($\lambda 1$) after the interference removing.

The acquired second noise amount parameter ($\sigma'_{\lambda1}$) is compared with the standard deviation ($\sigma(S)$) in the minute region including the pixel of interest. In a case where the standard deviation ($\sigma(S)$) is less than or equal to the second noise amount parameter ($\sigma'_{\lambda1}$), the pixel of interest is determined as a pixel of the flat region, and filter processing of reducing the noise (second noise) is performed by applying a smoothing filter to the pixel of interest.

On the other hand, in a case where the standard deviation ($\sigma(S)$) exceeds the second noise amount parameter ($\sigma'_{\lambda1}$), the pixel of interest is determined as a pixel of the edge region, and filter processing of reducing the noise (second noise) while preserving the edge is performed by applying an edge-preserving smoothing filter to the pixel of interest.

By performing the same noise reducing processing as above with respect to the signal values of all pixels of the second captured data of the wavelength ($\lambda1$) after the interference removing, the second noise included in the second captured data of the wavelength ($\lambda1$) is reduced. In addition, the noise reducing processing is also performed with respect to the second captured data of the other wavelengths ($\lambda2$ and $\lambda3$) after the interference removing.

By performing conversion of the noise amount parameters (conversion from the first noise amount parameters into the second noise amount parameters) in accordance with the interference removing parameters (C11 to C33), whether the pixel of interest is a pixel of the flat region or a pixel of the edge region can be accurately determined. Accordingly, the noise reducing can be suitably performed with respect to the second captured data after the interference removing.

Next, another embodiment of conversion of the noise amount parameters illustrated in step S50 in FIG. 6 will be described.

In step S50 illustrated in FIG. 6, each time the RAW data is acquired, the noise amount map consisting of the second noise amount parameters ($\sigma'_{\lambda1}$, $\sigma'_{\lambda2}$, and $\sigma'_{\lambda3}$) is generated by performing the operation in [Expression 2]. Instead, the second noise amount parameters ($\sigma'_{\lambda1}$, $\sigma'_{\lambda2}$, and $\sigma'_{\lambda3}$) are calculated from three variables of ($\sigma(S1)$, $\sigma(S2)$, and $\sigma(S3)$) determined in advance from the first noise amount parameter $\sigma(S)$ and the signal values S1, S2 and S3 and from the interference removing parameters (C11 to C33) using [Expression 2] for each combination of the three variables. A conversion table (in the present example, a three-dimensional look-up table) from which the second noise amount parameters ($\sigma'_{\lambda1}$, $\sigma'_{\lambda2}$, and $\sigma'_{\lambda3}$) can be read out is created using the three variables of the first noise amount parameters ($\sigma(S1)$, $\sigma(S2)$, and $\sigma(S3)$).

A storage capacity of the conversion table can be suppressed by restricting the number of pieces of data of the first noise amount parameters ($\sigma(S1)$, $\sigma(S2)$, and $\sigma(S3)$) to its necessary minimum.

By creating the conversion table and storing the conversion table in the memory 110 (first memory), the three first noise amount parameters ($\sigma(S1)$, $\sigma(S2)$, and $\sigma(S3)$) can be calculated from the first captured data, and the corresponding second noise amount parameters ($\sigma'_{\lambda1}$, $\sigma'_{\lambda2}$, and $\sigma'_{\lambda3}$) can be read out from the conversion table using the calculated three first noise amount parameters ($\sigma(S1)$, $\sigma(S2)$, and $\sigma(S3)$) as the variables.

In addition, the second noise amount parameters ($\sigma'_{\lambda1}$, $\sigma'_{\lambda2}$, and $\sigma'_{\lambda3}$) may not be generated each time the RAW data is acquired.

That is, the processor 100 stores the second noise amount parameters ($\sigma'_{\lambda1}$, $\sigma'_{\lambda2}$, and $\sigma'_{\lambda3}$) in the memory 110, newly acquires the second noise amount parameters based on a condition set in advance, and updates the second noise amount parameters stored in the memory 110 (second memory) with the newly acquired second noise amount parameters.

Accordingly, the second noise amount parameters stored in the memory can be used unless the condition set in advance changes.

An example of the condition set in advance is a change of the subject. In a case where the subject moves or the multispectral camera 1 is moved with respect to the subject, the subject changes. The change of the subject can be detected by obtaining, for example, a cross-correlation between the previous first captured data and the current first captured data.

Another example of the condition set in advance is a change of the imaging condition of the multispectral camera 1. Examples of the imaging condition of the multispectral camera 1 include the focus position and an illumination condition with respect to the subject.

[Other]

While the data processing apparatus 2 of the present embodiment is an apparatus separated from the multispectral camera 1, the present invention may be applied to an apparatus in which the multispectral camera 1 and the data processing apparatus 2 are integrated, that is, the multispectral camera 1 comprising the data processing apparatus 2.

In addition, while the filter unit 20 of the present example has three circular opening regions at equal intervals as the opening region allowing transmission of light of different transmission wavelength ranges, the shape and the number of opening regions are not limited thereto. For example, a circular pupil region may have opening regions of four circular sectors having a central angle of 90° or opening regions of three circular sectors having a central angle of 120°.

In addition, in the present embodiment, for example, a hardware structure of a processing unit such as the processor 100 of the data processing apparatus 2 that executes various types of processing corresponds to various processors illustrated as follows. The various processors include a central processing unit (CPU) that is a general-purpose processor functioning as various processing units by executing software (program), a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like.

One processing unit may be composed of one of the various processors or may be composed of two or more processors of the same type or different types (for example, a plurality of FPGAs or a combination of a CPU and an FPGA). In addition, a plurality of processing units may be composed of one processor. As an example of a plurality of processing units composed of one processor, first, as represented by a computer such as a client and a server, a form in which one processor is composed of a combination of one or more CPUs and software and the processor functions as a plurality of processing units is possible. Second, as represented by a system on chip (SoC) and the like, a form of using a processor that implements functions of the entire system including a plurality processing units in one integrated circuit (IC) chip is possible. Accordingly, various processing units are configured using one or more of the various processors as a hardware structure.

Furthermore, the hardware structure of the various processors is more specifically an electric circuit (circuitry) in which circuit elements such as semiconductor elements are combined.

In addition, the present invention includes the data processing program that is installed on a computer to cause the computer to function as the data processing apparatus according to the embodiment of the present invention and a non-volatile storage medium on which the data processing program is recorded.

Furthermore, the present invention is not limited to the above embodiment, and various modifications, of course, can be made without departing from the spirit of the present invention.

EXPLANATION OF REFERENCES

1: multispectral camera
2: data processing apparatus
10: imaging optical system
10A: front group lens
10B: rear group lens
20: filter unit
30: image sensor
100: processor
110: memory
120: display
130: input-output interface
140: operating part
BPF1: first bandpass filter
BPF2: second bandpass filter
BPF3: third bandpass filter
F: basic arrangement pattern
P1, P2, P3, P4: micropolarizer
PL1, PL2, PL3: polarizing filter
S10: step
S20: step
S30: step
S40: step
S50: step
S60: step

What is claimed is:

1. A data processing apparatus comprising:
a processor configured to process first captured data that corresponds to a plurality of wavelength ranges output from an image sensor of a multispectral camera having an opening region allowing transmission of light of different transmission wavelength ranges at a pupil position or near the pupil position and that includes first noise,
wherein the processor is configured to:
acquire an interference removing parameter for removing an interference component included in the first captured data;
perform interference removing processing of removing the interference component included in the first captured data based on the interference removing parameter to generate second captured data; and
perform noise reducing processing of reducing second noise included in the second captured data
acquire noise characteristic data indicating a noise characteristic of the first captured data;
acquire a first noise amount parameter based on a signal value of a pixel of the first captured data and on the noise characteristic data; and acquire a second noise amount parameter based on the acquired first noise amount parameter and on the interference removing parameter.

2. The data processing apparatus according to claim 1, wherein in the interference removing processing, at least duplicate images caused by the interference component are removed.

3. The data processing apparatus according to claim 1, wherein the processor is configured to store the second noise amount parameter in a first memory as a conversion table using the first noise amount parameter as a variable.

4. The data processing apparatus according to claim 1, wherein the processor is configured to store the second noise amount parameter in a second memory, newly acquire the second noise amount parameter based on a condition set in advance, and update the second noise amount parameter stored in the second memory with the newly acquired second noise amount parameter.

5. The data processing apparatus according to claim 4, wherein the condition set in advance is a change of a subject.

6. The data processing apparatus according to claim 4, wherein the condition set in advance is a change of an imaging condition of the multispectral camera.

7. The data processing apparatus according to claim 1, wherein the noise reducing processing is processing of reducing the second noise with respect to the second captured data using the second noise amount parameter.

8. The data processing apparatus according to claim 1, wherein the noise reducing processing is processing of reducing the second noise based on a feature amount of an image structure of a subject.

9. The data processing apparatus according to claim 1, wherein in the noise reducing processing, whether a pixel of interest of the second captured data for reducing noise is a pixel of a flat region or a pixel of an edge region is determined by comparing at least the second noise amount parameter with the noise characteristic, in a case where the pixel of interest is determined as a pixel of the flat region, filter processing of reducing the second noise is performed by applying a smoothing filter to the pixel of interest, and in a case where the pixel of interest is determined as a pixel of the edge region, filter processing of reducing the second noise is performed while preserving an edge by applying an edge-preserving smoothing filter to the pixel of interest.

10. A multispectral camera comprising:
an imaging optical system in which a plurality of first polarizing filters having different polarizing directions are disposed in the opening region;
the image sensor including a plurality of second polarizing filters that are disposed in each pixel of the image sensor and that correspond to the plurality of first polarizing filters; and
the data processing apparatus according to claim 1.

11. A data processing method of processing first captured data that corresponds to a plurality of wavelength ranges output from an image sensor of a multispectral camera and that includes first noise, the method comprising:
a step of acquiring an interference removing parameter for removing an interference component included in the first captured data;
a step of performing interference removing processing of removing the interference component included in the first captured data based on the interference removing parameter to generate second captured data; and a step of performing noise reducing processing of reducing second noise included in the second captured data, a step of acquiring noise characteristic data indicating a noise characteristic of the first captured data;

a step of acquiring a first noise amount parameter based on a signal value of a pixel of the first captured data and on the noise characteristic data; and a step of acquiring a second noise amount parameter based on the acquired first noise amount parameter and on the interference removing parameter wherein a processor is configured to execute processing of each step.

12. The data processing method according to claim 11, wherein in the step of removing the interference component, at least duplicate images caused by the interference component are removed.

13. The data processing method according to claim 11, further comprising:

a step of acquiring a corresponding second noise amount parameter from a conversion table based on the first noise amount parameter, wherein the conversion table stores the second noise amount parameter using the first noise amount parameter as a variable.

14. The data processing method according to claim 11, wherein in the processing of reducing the second noise, the second noise is reduced with respect to the second captured data using the second noise amount parameter.

15. The data processing method according to claim 11, wherein in the processing of reducing the second noise, the second noise is reduced based on a feature amount of an image structure of a subject.

16. A non-transitory, computer tangible readable recording medium on which a program for causing, when read by a computer, a processor of the computer to execute the data processing method according to claim 11 is recorded.

* * * * *